(12) United States Patent
Curwen et al.

(10) Patent No.: US 9,286,407 B2
(45) Date of Patent: Mar. 15, 2016

(54) BOOKMARKING INTERNET RESOURCES IN AN INTERNET BROWSER

(75) Inventors: Gillian Curwen, Hants (GB); Robert Harris, Dorset (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2235 days.

(21) Appl. No.: 12/301,235

(22) PCT Filed: Mar. 19, 2007

(86) PCT No.: PCT/EP2007/052589
§ 371 (c)(1),
(2), (4) Date: Oct. 30, 2009

(87) PCT Pub. No.: WO2007/134894
PCT Pub. Date: Nov. 29, 2007

(65) Prior Publication Data
US 2010/0050067 A1    Feb. 25, 2010

(30) Foreign Application Priority Data
May 20, 2006   (GB) .................................. 0610119.0

(51) Int. Cl.
*G06F 17/00* (2006.01)
*G06F 17/30* (2006.01)
*G06F 17/22* (2006.01)

(52) U.S. Cl.
CPC ...... *G06F 17/30884* (2013.01); *G06F 17/2247* (2013.01)

(58) Field of Classification Search
CPC ....................... G06F 17/2247; G06F 17/30884
USPC ....................................................... 715/206
See application file for complete search history.

(56) References Cited

U.S. PATENT DOCUMENTS 6,321,228 B1 *  11/2001  Crandall  ........... G06F 17/30864
6,408,316 B1 *   6/2002  Himmel  ............ G06F 17/30884
                                                          707/999.01

(Continued)

FOREIGN PATENT DOCUMENTS

JP         10-207898 A      8/1998
JP       2000-020536 A      1/2000

(Continued)

OTHER PUBLICATIONS

Pretschner et al., Ontology Based Personalized Search, IEEE 1999, pp. 1-8.*

(Continued)

*Primary Examiner* — Cong-Lac Huynh
(74) *Attorney, Agent, or Firm* — Steven L. Nichols; Fabian VanCott

(57) ABSTRACT

A method of bookmarking internet resources in an internet browser includes providing to a user an internet resource discovered by a search conducted via the browser in accordance with user supplied criteria; creating, responsive to a bookmarking request from the user, bookmark data having identifying data for the internet resource and an associated resource representation of the internet resource; and creating a hierarchy, for presentation to the user, of representations of internet resources for which bookmarking has been requested and of associated search criteria, each bookmarked resource representation being placed subordinate to corresponding associated search criteria representation in the hierarchy. A user can navigate to a bookmarked representation of a resource of interest via the corresponding associated search criteria representation for selection and subsequent retrieval of the resource of interest.

25 Claims, 5 Drawing Sheets

(56) References Cited

U.S. PATENT DOCUMENTS

| | | | |
|---|---|---|---|
| 6,631,496 B1 | 10/2003 | Li et al. | |
| 6,725,227 B1* | 4/2004 | Li | |
| 6,751,777 B2* | 6/2004 | Bates | G06F 17/30884 707/E17.013 |
| 7,673,234 B2* | 3/2010 | Kao et al. | 715/255 |
| 7,694,227 B2* | 4/2010 | Rydahl et al. | 715/745 |
| 7,712,021 B2* | 5/2010 | Ross et al. | 715/206 |
| 7,747,937 B2* | 6/2010 | Rojer | 715/206 |
| 7,962,512 B1* | 6/2011 | Sholtis | G06F 17/30566 707/777 |
| 8,131,718 B2* | 3/2012 | Tran | 707/732 |
| 8,224,788 B2* | 7/2012 | Schachter | G06F 17/30884 707/672 |
| 9,026,534 B2* | 5/2015 | Kausik | G06F 17/30884 707/737 |
| 2002/0078087 A1* | 6/2002 | Stone | 707/511 |
| 2002/0184095 A1* | 12/2002 | Scullard et al. | 705/14 |
| 2005/0114756 A1* | 5/2005 | Lehikoinen | G06F 17/30884 715/206 |
| 2005/0228860 A1* | 10/2005 | Hamynen | G06F 17/30241 709/203 |
| 2005/0256956 A1* | 11/2005 | Littlefield et al. | 709/225 |
| 2006/0195790 A1* | 8/2006 | Beaupre | G06F 17/30766 715/727 |
| 2006/0212445 A1* | 9/2006 | Rydahl et al. | 707/5 |
| 2007/0022385 A1* | 1/2007 | Denissov | 715/745 |
| 2007/0110047 A1* | 5/2007 | Kim | 370/389 |
| 2007/0244903 A1* | 10/2007 | Ratliff et al. | 707/10 |
| 2007/0271228 A1* | 11/2007 | Querel | G06F 17/30876 |
| 2008/0140523 A1* | 6/2008 | Mahoney | G06Q 30/0256 705/14.54 |
| 2008/0243517 A1* | 10/2008 | Muschett et al. | 704/275 |
| 2009/0119572 A1* | 5/2009 | Koivunen | 715/206 |
| 2009/0177519 A1* | 7/2009 | Tota et al. | 705/10 |
| 2009/0228126 A1* | 9/2009 | Spielberg et al. | 700/94 |
| 2010/0088583 A1* | 4/2010 | Schachter | 715/206 |
| 2010/0205210 A1* | 8/2010 | Gras | 707/770 |
| 2010/0268706 A1* | 10/2010 | Rydahl et al. | 707/723 |
| 2011/0314008 A1* | 12/2011 | Badros et al. | 707/723 |
| 2014/0298152 A1* | 10/2014 | Malla | G06F 17/241 715/230 |

FOREIGN PATENT DOCUMENTS

| | | |
|---|---|---|
| JP | 2000-132565 A | 5/2000 |
| JP | 2005-056371 A | 3/2005 |
| WO | 0067159 A2 | 11/2000 |

OTHER PUBLICATIONS

Rizzo et al., Evaluating the Semantic Memory of Web Interactions in the xMem Project, ACM 2005, pp. 185-192.*

Barbeau et al., OTHY: Object to Hypermedia, Google 1999, pp. 349-363.*

Kanawati et al., Informing the Design of Shared Bookmark Systems, Google 2000, pp. 1-10.*

Abrams et al., Information Archiving with Bookmarks: Personal Web Space Construction and Organization, ACM 1998, pp. 41-48.*

Shinsuke Nakajima et al., "A Context-Dependent Web Bookmark Reflecting Browsing Histories" Information Processing Society of Japan, IPSJ Symposium Series, Dec. 5, 2001, vol. 2001 No. 17, p. 201-208, english abstract included.

* cited by examiner

FIG. 1

| 101 | 102 | 103 | 104 | 105 |
|---|---|---|---|---|
| WEB PAGE NAME | WEB PAGE URL | ICON REPRESENT-ATION | SHORTCUT KEY FOR REDISPLAY | TEXTUAL DESCRIPTION |

| 141 | 142 | 143 | 144 | 145 | 151 | 152 |
|---|---|---|---|---|---|---|
| WEB PAGE NAME | WEB PAGE URL | ICON REPRESENT-ATION | SHORTCUT KEY FOR REDISPLAY | TEXTUAL DESCRIPTION | SEARCH ENGINE NAME | SEARCH PARAMETERS |

150

| 153 | 154 |
|---|---|
| STORED ACCESS HISTORY SEQUENCE | WEB PAGE NAME (MODIFIED) |

BOOKMARKING INTERNET RESOURCES IN AN INTERNET BROWSER

RELATED APPLICATIONS

The present application is filed under 35 U.S.C. §371 as a national stage submission of International Application No. PCT/EP2007/052589, which has an international filing date of Mar. 19, 2007 and a priority date of May 20, 2006. Accordingly, the present application claims a priority filing date of May 20, 2006 pursuant to 35 U.S.C. §§119(a) and 365(b).

BACKGROUND OF THE INVENTION

The present specification relates to internet browsers and, in particular, to methods of bookmarking in such browsers.

An internet browser is a computer program by means of which resources available on the Internet (also referred to herein as the web) can be identified and retrieved, using a browser interface, for display by a user's computer. Such resources are typically pages of information known as web pages.

Each web page has a unique address called a Universal Resource Locator (URL), and the basic method of accessing a given web page is to key the URL into the browser and request its display (by, for example, clicking on a 'Go' button or pressing the enter key).

Over time, it is common for a user to accumulate a selection of web pages that he or she wishes to access on an ongoing or repeated basis. Instead of keying in the URL each time the relevant web page is to be displayed, the browser maintains a collection of page or other resource identifiers, visible or otherwise perceptible by the user, which obviates the need for the full URL to be provided. Each identifier in this collection is commonly referred to as a 'Bookmark' (or a 'Favorite'). In a conventional browser graphic user interface (GUI) this collection of bookmarks is displayed in a special panel from which the selection of the required web page can be made. A bookmark, as displayed, normally consists of the title of the web page together with its URL, both of which are stored in an associated bookmark file of meta data. A bookmark does not contain any information as to how the web page was located or derived: that is to say, the journey to the bookmark is not recorded, only the destination. It will be recognized that the term "bookmark" may have two connotations, depending on the context. It may refer either to the physical representation of a resource of interest on the browser user interface or to the equivalent data, stored electronically in some sort of repository in the browser.

In general, the collection of bookmarks is presented to the user as a list of items (each item in the list being a given bookmark). Items in this list may appear in alphabetic order of the name of the bookmark, or in an alphabetic order of the URL, or in time-of-addition order, or in inverse of time-of-addition order, or the position in the list can be dynamic based upon usage (so that, for example, most used bookmarks appear towards the front of the list ahead of those accessed less frequently).

BRIEF SUMMARY OF THE INVENTION

A method of bookmarking internet resources in an internet browser includes providing to a user an internet resource discovered by a search conducted via the browser in accordance with user supplied criteria; creating, responsive to a bookmarking request from the user, bookmark data having identifying data for the internet resource and an associated resource representation of the internet resource; and creating a hierarchy, for presentation to the user, of representations of internet resources for which bookmarking has been requested and of associated search criteria, each bookmarked resource representation being placed subordinate to a corresponding associated search criteria representation in the hierarchy. A user can navigate to a bookmarked representation of a resource of interest via the corresponding associated search criteria representation for selection and subsequent retrieval of the resource of interest.

A computer program product for bookmarking an internet resource in an internet browser includes a computer usable medium having computer usable program code embodied therewith. The computer usable program code includes computer usable program code configured to, in response to a bookmarking request from a user corresponding to an internet resource discovered by means of a search conducted in accordance with user supplied criteria, create bookmark data having identifying data for the internet resource and create an associated resource representation of the internet resource. The computer usable program code also includes computer usable program code configured to create a hierarchy, for presentation to the user, of representations of internet resources for which bookmarking has been requested and of associated search criteria, each bookmarked resource representation being placed subordinate to a corresponding associated search criteria representation in the hierarchy. A user can navigate to a bookmarked representation of a resource of interest via the corresponding search criteria representation for selection and subsequent retrieval of the resource of interest.

An internet browser system includes a computing device in communication with the Internet. The computing device is configured to provide to a user an internet resource discovered by an internet search in accordance with user supplied criteria; create, responsive to a bookmarking request from the user, bookmark data having identifying data for the internet resource and an associated resource representation of the internet resource; and create a hierarchy, for presentation to the user, of representations of internet resources for which bookmarking has been requested and of associated search criteria, each bookmarked resource representation being placed subordinate to a corresponding associated search criteria representation in the hierarchy. A user can navigate to a bookmarked representation of a resource of interest via the corresponding search criteria representation for selection and subsequent retrieval of the resource of interest.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

FIG. 1 is a diagram of an illustrative conventional bookmark.

FIG. 2 is a diagram of an illustrative extended bookmark employed in an internet browser according to one exemplary embodiment of the principles described herein.

Throughout the drawings, identical reference numbers designate similar, but not necessarily identical, elements.

DETAILED DESCRIPTION OF THE INVENTION

Figure 3:
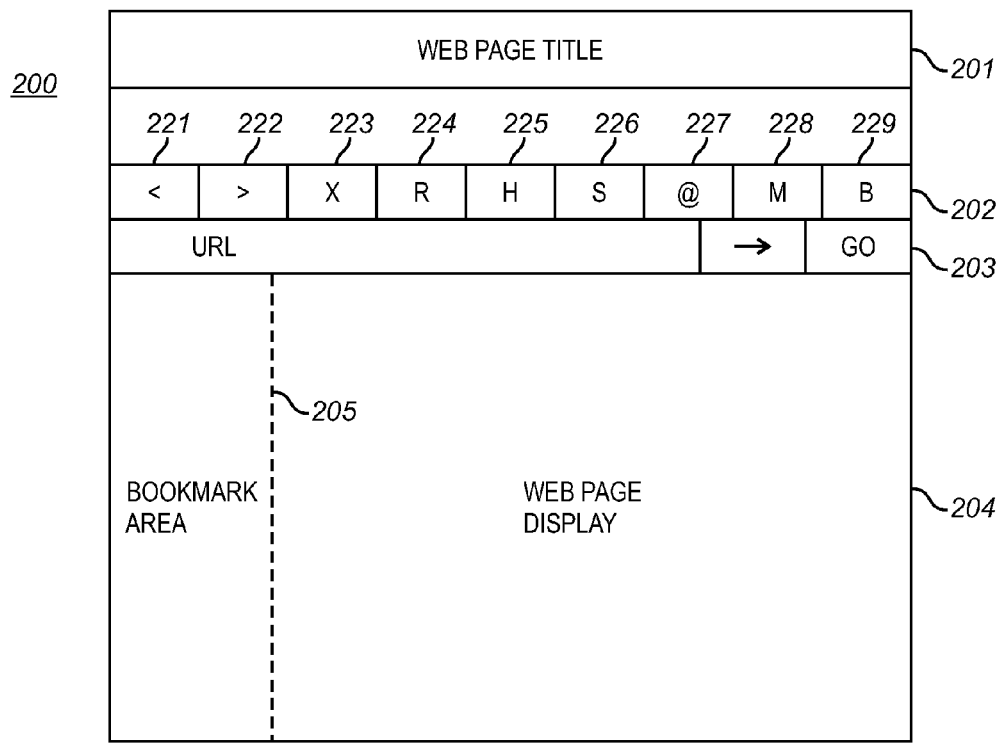
FIG. 3 is a diagram of an illustrative graphic user interface (GUI) as employed in a browser according to one exemplary embodiment of the principles described herein.

In some cases, a user may accumulate an extensive collection of bookmarks over time in an internet browser. These bookmarks may be presented to the user by the browser as a list with no particular ordering, thus resulting in unwieldy access to desired bookmarks. As more bookmarks are added, this situation may be compounded and become more frustrating for the user. Consequently, displaying a simple list of bookmarks in the browser interface may become difficult in usability terms, especially for users who do not have full interactive capabilities. Accordingly, the effort spent in locating the desired bookmark may generally become unacceptably long.

Although most browsers typically provide for the classification of each bookmark in terms of user-generated hierarchical folders, many browser users usually may simply add the bookmark into the default location without undergoing the task of hierarchical partitioning, thereby resulting in a single list of bookmarks with no attempt at logical hierarchical classification by the typical user.

To address these and other issues, the present specification provides systems and methods related to bookmarking in internet browsers. In these systems and methods, an internet resource discovered by a search in accordance with user supplied criteria is bookmarked by creating bookmark data having identifying data for the internet resource and creating an associated resource representation of the internet resource. A hierarchy stores representations of internet resources for which bookmarking has been requested and of associated search criteria, each bookmarked resource representation being placed subordinate to a corresponding associated search criteria representation in the hierarchy. A user can then navigate to a bookmarked representation of a resource of interest via the corresponding associated search criteria representation for selection and subsequent retrieval of the resource of interest.

These systems and methods allow a user to continue to save favored web pages using the standard browser bookmarking user-interface technique without having to worry about bookmark housekeeping in order to avoid the problem of increasing bookmark unmanageability as described above. The responsibility for folder creation and placement of a bookmark is transferred to the browser leaving the browser user free to continue unencumbered. Thus, when the user requests a web page to be bookmarked, the bookmark is semantically and intelligently classified by the browser without the need for any positive decisive actions to be taken by the browser user.

As used in the present specification and in the appended claims, the term "resource" or "internet resource" refers broadly to any file or other data retrievable from the Internet. Thus, internet resources can be web pages for display to a user written in hypertext markup language (HTML) and transferred over the internet using hypertext transfer protocol (HTTP). Alternatively, internet resources may include general files for computer, rather than human use, obtained using file transfer protocol (FTP). Such files may still need to be organized by a user.

The associated search criteria can include a search argument or a search engine identifier or both. Employing these in the classification of the saved browser bookmark ensures that the browser user's actions are effectively mapped to browser bookmark placement in the hierarchy.

Where both the search engine identifier and the search arguments are used, they are ideally represented in a hierarchical arrangement in which the representation of the search argument is subordinate to the representation of the search engine.

It should also be noted that the hierarchy needs to be created before a bookmark representation can be stored in it. Creation of the hierarchy may also conveniently precede creation of the bookmark data.

Preferably, the hierarchical representation employs a folder paradigm, whereby the bookmarked resource representations are only revealed upon selection by the user of an associated search criteria representation.

Preferably the browser's intelligent classification methodology is based upon a composite of search engine and search arguments. The search arguments entered by the user determine the folder name in which the bookmark is stored. Consequently, the actual naming of the relevant folder is determined by the search engine chosen by the browser user. For example if the Google search engine was originally used for a web search and as a consequence a web page was bookmarked by the user, a top level folder entitled 'Google' would be created by the browser and the folder, intuitively titled in accordance with the search arguments and containing the bookmark itself would be placed immediately below it in the hierarchy.

It will be noted that the present invention still enables usage of the well-known file system folder paradigm and thus avoids changing the browser user interface. That is, a folder is created by the browser in a suitable position in the hierarchy, appropriately titled and the bookmark is stored away inside it.

An alternative embodiment could introduce a new browser interface. However, this would require the user to become familiar with the new interface and proficient in its use. The concept of a folder to hold a group of logically related data (albeit bookmarks or documents) or indeed to hold other folders is widely known, and thus from an ease-of-use perspective provides the preferred basis of bookmark classification for implementation of the present invention.

It is also a preferred feature of the invention that the current access history for the resource of interest is recorded in the bookmark data, the current access history comprising resource identifying data of resources traversed by the browser during the search to arrive at the resource of interest.

Where the search engine is itself an internet resource, this facilitates the matching of resource identifying data in the current access history with known search engine identifying data in order to identify the search engine used and using the name of the identified search engine as a top level search criteria representation in the hierarchy.

Further, where the resource identifying data matched with the search engine also includes search arguments, the resource identifying data which identifies the search engine can be parsed to extract the search arguments which can then be used as a second level search criteria representation in the hierarchy.

Another problem with prior art bookmarking is that, when a bookmark page is retrieved, the original hierarchy and order of visited web pages is lost. The prior art only restores the relevant finally bookmarked web page. This is an undesirable aspect of prior art bookmark processing—as contextual information relating to the bookmarked web page (the traversed pages used to reach it) is lost. Even the "History" facility, offered by Internet Explorer only lists the pages visited by web site and does not permit an easy retracing of steps.

However, according to a preferred feature of the invention, by examining the stored access history, in response to subsequent selection of the bookmarked resource representation and retrace requests from the user, the preceding resources traversed by the browser can be retrieved in reverse order.

Thus, by additionally saving within the bookmark data file of the resource of interest, the web addresses (URLs) of these linked resources (for example web pages), the full context of the bookmarked resource or web page is restored. Use of this contextual information enables this full path of navigation to a bookmarked web page to be recovered when the bookmark is retrieved.

Optionally, the search argument, search engine identifier or both can be included in the bookmark data and treated as part of the stored access history and similarly retrieved. It will be noted that these are not absolutely necessary as they are visible, in any case, in the hierarchy representation presented to the user.

In summary, the present invention classifies browser bookmarks based on a combination of the search engine used and the original search arguments thereby entered by the user. In doing so it exploits the semantic/heuristic concept of 'remembering by doing' by capturing the user's actions and associating them with the placement of the browser bookmark. The search arguments are stored in the bookmark's meta data and used by the browser at folder creation time to name the folder created to hold the bookmark. Thus, by collectively transferring control of bookmark management from the browser user to the browser, using folders as a bookmark repository and in facilitating a more brain-friendly, intuitive bookmark retrieval process, a more efficient ease-of-use experience is created.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Before describing the novel aspects of how the invention is implemented in the present case, those implementation aspects common to conventional browser technology will first be described in more detail As has been made clear above, a web browser is software that can retrieve and present web pages accessed through the internet. Browsers can be text only (as is the case for the www browser provided within the IBM CMS environment) or operate in a Graphical User Interface (GUI) environment such as Microsoft's INTERNET EXPLORER (IE), Mozilla's FIREFOX or the Free Software Foundation's OPERA (all names used may be trademarks of their respective companies or organizations). In all cases, these browsers provide a mechanism whereby selected web pages can be associated with a respective bookmark.

A bookmark may be thought of as a persistent linkage upon a per user (or for all browser users) basis linking a given web page and its URL (Universal Resource Locator) to provide an easy way of redisplaying the web page.

As shown in FIG. 1, the conventional bookmark (100), as stored data or as presented to the user, may include the name (101) of a web Page, the URL (102) of the web page, some sort of icon representation (103) for selection (for GUI based Browsers), a shortcut key (104) for redisplay, and a textual description (105) or comment.

A set of all bookmarks may be stored electronically in a persistent fashion in a data repository. This repository may be implemented in a fashion best suited for the operating system in which the browser is executing. For example, the repository may include a plurality of very small bookmark files (100), as set out above.

These files may reside in an operating system's file system as distinct objects (each bookmark being a distinct file) or in some sort of database (all bookmarks residing within a single file which is the database). For example, in the Microsoft Windows environment using the Microsoft IE browser, bookmarks are individual files and reside within the file system in the folder hierarchy of:

$$\text{Disk} \rightarrow \text{Documents and Settings} \rightarrow \text{<userid>} \rightarrow \text{Favorites}$$

with the file name of the bookmark being the name of the web page (101).

Alternatively, for example, in the Mozilla Firefox browser running within the Microsoft Windows environment, a bookmark is an entry in a database (physically implemented as a file containing a XML-structured document which contains embedded elements, each of which is a bookmark).

In both the single file per bookmark and multiple bookmarks in a single data store cases, the concept of a bookmark hierarchy is employed. When a bookmark is created, the user has the opportunity to classify the bookmark using a hierarchical folder paradigm.

In the single file per bookmark environment, this classification involves the creation of file system folders representing the hierarchical classification. In the data store environment, the same concept of folders is employed, but in this case they are logical divisions within the data store. This implementation decision is not visible to the user: it is the hierarchical folder paradigm that is visible to the user and which is also of importance in the implementation of the present invention.

A preferred feature of this implementation of the present invention also makes use of a further aspect of conventional browser History processing, which is that of recording the sequence of web pages visited in the current browser session. This sequence may then be retraced in either direction by using the browser backwards and forward processing (commonly offered by the "<" (Back) and ">" (Forward) icons on a GUI-based browser). This usage is strictly represented as a sequence, for example:

$$\text{Home page} \rightarrow \text{Search Engine} \rightarrow A \rightarrow B \rightarrow C \quad \text{(i)}$$

$$\rightarrow D \rightarrow E \quad \text{(ii)}$$

$$\rightarrow F \rightarrow G \quad \text{(iii)}$$

assuming that, when on web page C, the backwards button was used to return to B and then D was accessed. The full search sequences leading to pages C, E and G are:

$$\text{Home page} \rightarrow \text{Search Engine} \rightarrow A \rightarrow B \rightarrow C \quad \text{(iv)}$$

$$\text{Home page} \rightarrow \text{Search Engine} \rightarrow A \rightarrow B \rightarrow D \rightarrow E \quad \text{(v)}$$

$$\text{Home page} \rightarrow \text{Search Engine} \rightarrow A \rightarrow F \rightarrow G \quad \text{(vi)}$$

Conventionally, although any of these sequences can be retraced by using the back button during a single browser session, they are lost after leaving the session, even if the pages C, E and G have been bookmarked. The present implementation of the invention utilizes such sequences by saving them in their respective bookmark data.

A final piece of conventional bookmark technology necessary for the implementation described herein is, in general terms, how internet search engines locate web pages (neglecting irrelevant features such as how search engines process information to produce rankings and display orders).

A web page is formatted using the Hypertext Markup Language (HTML). This consists of a sequence of items in the format of:

$$\text{<tag parms>data</tag>}$$

For example, the title of a web page is defined by the title tag:

$$\text{<title>RAH Software</title>}$$

where "RAH Software" is the page title.

This title element is conventionally displayed in GUI-based browsers in the first line of the window containing the visual aspect of the browser. This title element is also used to provide the web page name (101) of the bookmark (100) through which the web page can be rapidly redisplayed.

It will be recognized also that the search engine itself is just a 'normal' web page which is requested with parameters representing the search requirements. For example, a Google search for "GillCurwen" is actioned by the browser as a request for a web page of address:

http://www.google.co.uk/search?hl=en&q=GillCurwen.

Referring now to FIG. 2, the present invention makes use of an extended bookmark (150) which, in the implementation to be described, will be referred to as BM/X. This extended bookmark (150) requires the recording of the following information into the bookmark data repository (however or wherever it is saved): the name of the web Page (141), the URL of the web page (142), some sort of icon representation (143) for selection (for GUI based Browsers), a possible shortcut key (144) for redisplay, a possible textual description (145) (e.g. a comment), the name of the search engine (151) that initiated the sequence which caused the relevant bookmark to be saved, the search parameters (152) given to the search engine, the sequence of web pages (153) visited prior to the recording of the BM/X, and the name of the web page (154) taken from the <title> tag contained in the web page.

It will be noted in the above that items 141-145 are present in conventional bookmarks and are analogous to items 101-105 in FIG. 1.

In this description of BM/X processing, according to the present invention, it will be assumed that the execution environment is similar to the Microsoft Internet Explorer (IE) browser running inside the Microsoft Windows operating system. However, as mentioned above, the techniques used for implementation are common to all web browsers in all execution environments.

The browser may use a GUI window (200), illustrated schematically in FIG. 3, as its user interface which may include the following elements: a window title (201) which is dynamically modified to be the name of the web page being displayed; generally taken from the <title> element of the HTML.; a navigation toolbar (202) which contains icons representing common actions available to the user; a field (203) in which the URL of the web page currently displayed is visible or into which a new URL may be keyed and the associated page retrieved by user selection of the Go arrow; a display panel (204) which is the web page being displayed and may include a sub panel (205) for displaying either the bookmark list or the history list of pages visited.

The navigation toolbar (202) may include the following conventional operations: a Back button (221) for displaying the previous page (if available) in the access sequence; a Forward button (222) for displaying the next page (if available) in the access sequence; a Stop button (223) for causing the browser to abort an attempt to access a selected page; a Refresh button (224) for redisplaying the current page; a Home button (225) for redisplaying the browser's default home page; a search field (226) for entering search engine parameters, and a mechanism for selecting which search engine is to be used (alternatively a default search engine is selected via its corresponding web page); and a History button (227) displaying all sites visited over a predetermined amount of time.

Up to this point the buttons and layout of the GUI are essentially conventional. However, two further buttons are shown in the implementation of the invention which are not quite identical to those found in conventional web browsers: an icon (228) representing the Bookmark-Current-Page operation (analogous to the conventional "Add to Favorites" option after selection of Favorites button in Internet Explorer); and an icon (229) representing the display bookmarks function, used when a previously saved web page is to be revisited. It has the same function as the "Favorites" button in Internet Explorer though the bookmarks are displayed as determined by the invention.

Figure 4:
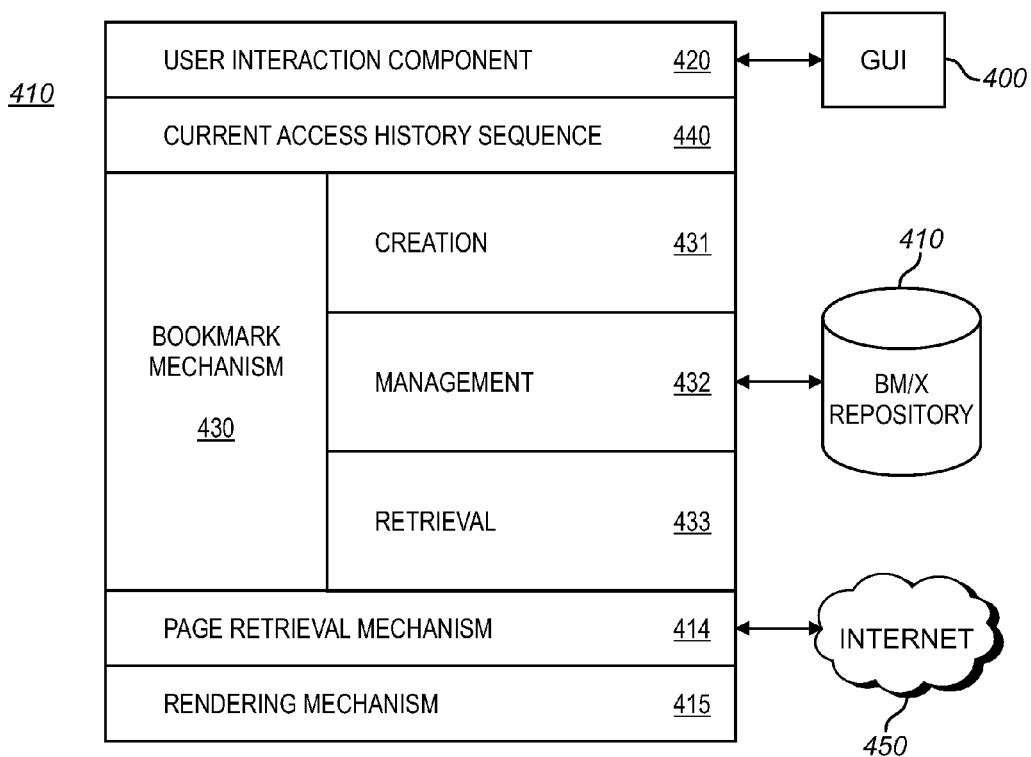
FIG. 4 is a block diagram of an illustrative internet browser according to one exemplary embodiment of the principles described herein.

Behind the browser GUI panel, the functional components of the browser 410 are illustrated in FIG. 4. With reference to FIG. 4, a user (400) controls the operation of the browser by sending commands (whether by hitting an icon in the GUI 200 or by supplying physical information) to a user interaction component (420). A request to display a web page, by hitting the GO arrow in the URL field 203 of browser GUI 200, will be sent to page retrieval mechanism (414) which will use the Internet (450) to locate and return the appropriate HTML formatted web page in known manner. The HTML file is then passed to rendering mechanism (415) which renders the page into displayable form. Each time a web page is retrieved, whether by a click on a hypertext link in the current web page or via specific keyed entry of the web page into field 203, an entry is added to an access history sequence (440).

The term 'sequence' is used in its technical sense of a collection of items ordered by time of addition. Conventionally, items are being shown as the left-most being the earliest in the sequence and the right-most being the latest item in the sequence. In general, therefore, items are added on the right-hand side of the sequence, generally referred to as at the end of the sequence (the start of the sequence being conventionally shown as the left-most item).

Use of the <(221) and >(222) buttons navigates backwards or forwards (if available) through this sequence (440). Use of the Home button (225) clears the sequence (440) as it returns the browser to its initial state for the session (displaying the user's default Home page).

To illustrate this, consider the following examples of actions which arise in accessing and bookmarking two web pages D and E and the effect on the contents of the current, that is to say, the real time access history sequence 440:

| | | |
|---|---|---|
| Home page | <hp> | (i) |
| Search Engine parms="RAH" | <hp,se RAH> | (ii) |
| A | <hp,se RAH,A> | (iii) |
| B | <hp,se RAH,A,B> | (iv) |
| C | <hp,se RAH,A,B,C> | (v) |
| < | <hp,se RAH,A,B> | (vi) |
| D | <hp,se RAH,A,B,D> | (vii) |
| E | <hp,se RAH,A,B,D,E> | (viii) |

The left hand column corresponds to user actions to navigate through a sequence of web pages and the right hand column contains the corresponding current access sequence up to and including each user action.

Consequently, if the pages D and E are selected for bookmarking by operation of the M button (228) in the browser interface (FIG. 3), the respective current access history sequences (vii) and (viii) will be stored in 153.

When the user requests creation of an extended BM/X bookmark by pressing the M button (228) (or requesting the operation by alternative input messages such as via a menu operation or a pointer device operation or via a visual or audible gesture etc.), this causes the bookmark creation component 431 of bookmark mechanism 430 (FIG. 4) to assemble the following information.

Firstly, with reference to FIG. 2, the same information as would be created by prior art bookmarking techniques is collected: the name (101) of the web Page from the <title> element by default (note that in the present case, the browser user is given the opportunity to amend and record it as item 154, below); the URL (102) of the web page from the web address of the current web page which is not conventionally amendable by the user; some sort of icon representation (103) for selection (by GUI based Browsers) usually set from the contents of the web page with a typical pictorial default; a possible shortcut key (104) for redisplay by presenting a dialogue into which the relevant key sequence can be quoted; and a possible textual description (comment) (105) obtained through a dialogue.

In most cases, all the optional dialogues are omitted by the user, and the basic portion of the bookmark is created by saving the name (101) and the URL (102) with the icon representation (103).

Additionally, when a BM/X bookmark is created, the following, additional data is automatically recorded without any user intervention: the name of the search engine (151) that initiated the sequence which caused the relevant bookmark to be saved; the search parameters (152) given to the search engine; the sequence (153) of web pages visited prior to the recording of the BM/X by saving the Access Sequence (440) as part of the BM/X bookmark data; and the name (154) of the web page as set by the web page from the contents of its <title> tag (which may be different from the name (101) if the user has elected to change the name (101) setting).

Figure 5:
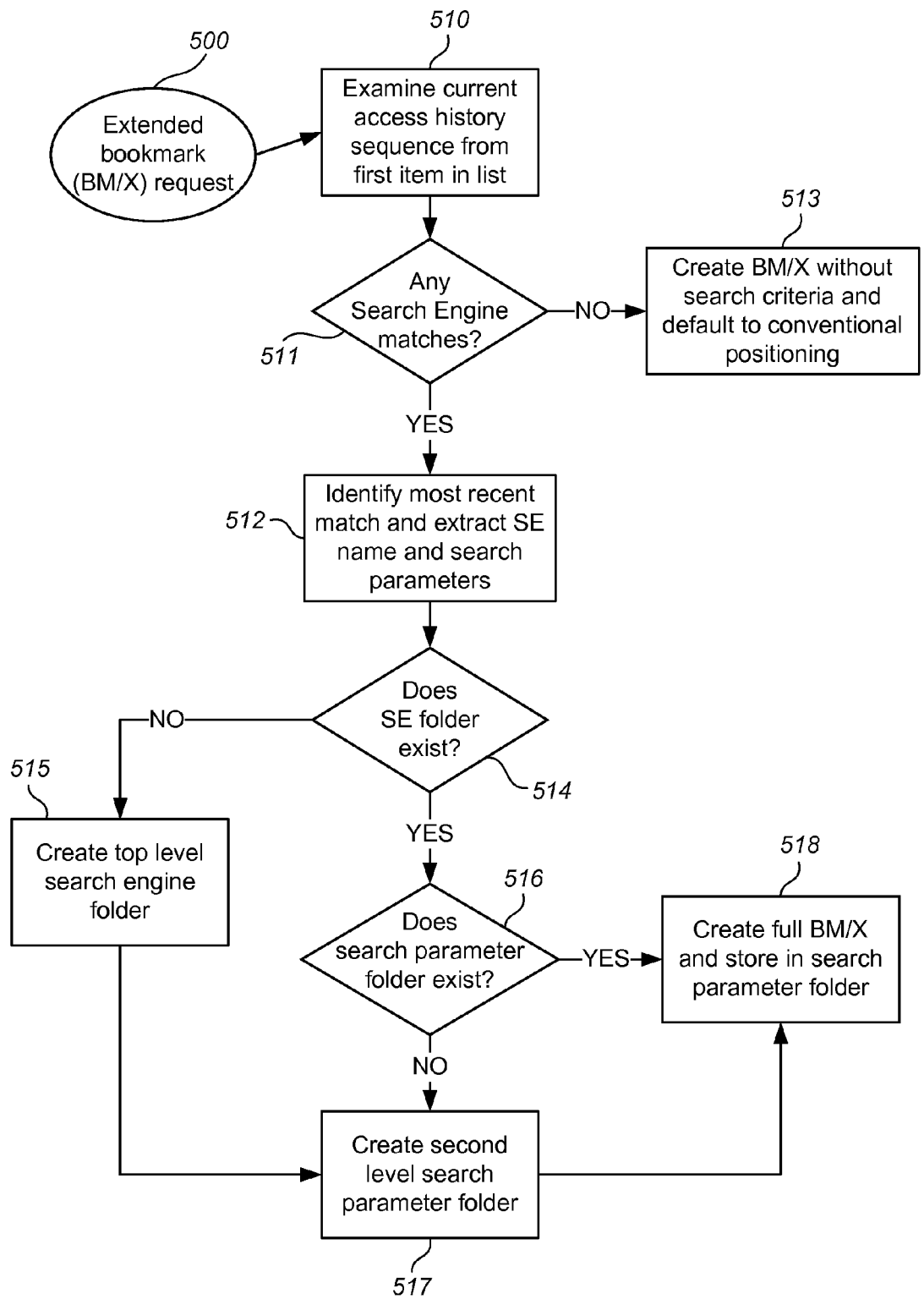
FIG. 5 is a flowchart of part of an illustrative method of bookmarking in an internet browser, according to one exemplary embodiment of the principles described herein.

The method of operation of the bookmark creation and management components (431, 432; FIG. 4) is shown in the flow diagram of FIG. 5.

As described in more detail below, the name of the search engine and the search parameters used to create the BM/X bookmark are derived from the current access sequence 440, held by the browser. Everything else in the BM/X bookmark, such as the access sequence and web page name is available directly from information held by the browser.

The implementation provided by this present invention identifies the web addresses (URLs) associated with search engines. These search engine URLs are well-known addresses and can either be hard coded or defined via browser definition facilities (for example, the Firefox browser enables the addition of search engines via a plug-in mechanism).

Consequently, in order to capture the search engine information (151, 152) into the BM/X bookmark, the current access history sequence (440) is scanned sequentially for a match of a known search engine name with the stored item, which is a web page address (URL). If such matching addresses are located in step 511 (FIG. 5), then the most recent matched address is parsed, in step 512 to extract the search parameters. The name of the search engine itself is implicit in the successful match. The results of this operation determine the search engine (151) and search parameters (152) set into the BM/X bookmark.

For example, given the presence of a web page of
http://www.google.co.uk/search?hl=en&q=GillCurwen
in the current access sequence (440), a match on "www.google.co.uk" would determine the search engine used was "Google" and, by parsing of the &q element, that the search parameters were "GillCurwen".

In the case of two or more search engines being located in the current access sequence (440), it is the most recent (that occurring in the right-most position in a conventional sequence in which items are added to the conceptual right-hand side of the sequence) that is used. If, in fact, the same search engine is used twice, the parameters of the most recent usage rule for the BM/X bookmark. If a modified search was latterly used, then the initial parameters will be repeated in the web page request as search engine requests are not stateful.

If no search engine is located in the Access Sequence (440), then, in step 513, the search criteria fields 151 and 152 are left blank and the BM/X bookmark is stored in the lowest level of the bookmark hierarchy, as it would be conventionally.

Assuming however, that a search engine name and search parameters have been found, it is necessary to determine, in step 514, if a top level folder already exists in the bookmark storage hierarchy for that search engine. If not, a top level folder is created in step 515. If a search engine folder does exist, it is still necessary to determine in step 516 if a second level folder for the same search parameters already exists (as the user may wish to bookmark two or more pages found by the same search).

If no search parameter folder exists, then in step 517, one is created, automatically providing a complete bookmark storage hierarchy for the pages of interest. Finally, having created the hierarchy, all the data for the page to be bookmarked are assembled and the BM/X bookmark is created and stored in the corresponding search parameter folder in step 518.

By this means, the BM/X bookmark is automatically recorded by means of accessing information already present within prior-art processing of browsers. The other information (153) is simply copied from information already known to the browser.

In the primary aspect of this present invention, the BM/X bookmark is stored in a folder according to the search criteria from which the web page was ultimately derived and bookmarked. The steps of creating the BM/X bookmark simply accesses the (151) search engine name to obtain the higher level folder name, and the search parameters (152) to set the second level name (these folders being created if not already present). This processing determines automatically the folder names (whether or not they physically exist or are virtually present in the data store bookmark implementation).

The name of the BM/X bookmark saved in the aforementioned fashion is the familiar name of the web page as is used for a conventional bookmark.

This processing does not preclude the existing prior-art processing for presenting a dialogue to the user in which the name of the bookmark can be amended (from the default of the title of the web page: in which case the (101) field is amended leaving the (154) field as the original setting from the <title> tag) and the folder location can be set; however, with BM/X processing the default folder location is set as described above.

For example, therefore, if in the exemplary sequence (i) to (viii) above, the search engine is Google and the BM/X bookmark for page D is created after step (vii), the BM/X bookmark would be created in the IE environment as:

Disk / Documents and Settings
/ <userid>
/ Favorites
/ Google
/ RAH
/ D.bookmark After the step (viii) to bookmark page E, a further bookmark would be created in the same folder (as the same search engine+parameters were used in both cases) to yield:

Disk / Documents and Settings
/ <userid>
/ Favorites
/ Google
/ RAH
/ D.bookmark ; E.bookmark Consider the following example of how the invention works in comparison with prior art bookmarking. If the user wanted information on bagless vacuum cleaners that were not heavy to use, a suitable search argument might be 'lightweight bagless vacuum cleaners'. The brain understands precisely what information is required (semantic linguistic processing) and is able to paraphrase the specific subject matter into keywords accordingly. Such a search argument within a web search engine (such as Google) might produce a list of matching web pages one of which might, according to the prior art, be bookmarked as 'fredbloggs.electrics'—this being the contents of the <title> tag in the source HTML for the web page.

At a later date, when the browser user wishes to retrieve the web page pertaining to vacuum cleaners the user would naturally tend to look for a bookmark with those keywords (the full search argument of 'lightweight bagless vacuum cleaners' may be partially recalled as 'vacuum cleaners'). Only as a last resort might the user consider 'fredbloggs.electrics' as being relevant to that long-time-ago search.

Earlier searches for say, Hi-Fi equipment, may also have resulted in web pages bookmarked with the identical or similar name of 'fredbloggs.electrics'. This is potentially very confusing because there is no direct association between the intuitive descriptive keywords originally expressed as search arguments and the bookmark names. However, this crucial information has been lost in the conventional bookmarking process.

Contrast this with how the present invention would retain the original descriptive search arguments for use by the browser in the novel placement of the bookmark.

Figure 6:
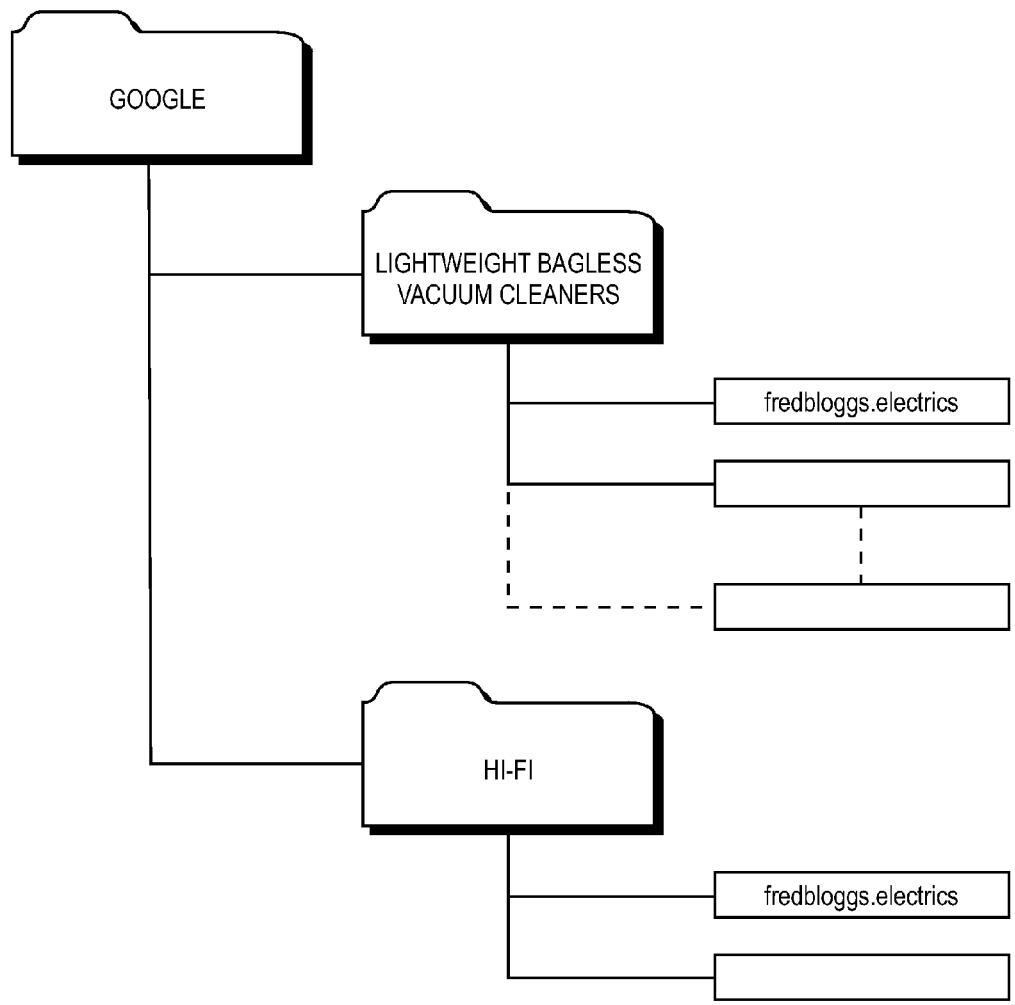
FIG. 6 is a diagram of an illustrative bookmark storage hierarchy according to one exemplary embodiment of the principles described herein.

Using the above example, the method according to the present invention described in connection with FIGS. 2 to 5, would generate a folder hierarchy, as illustrated in FIG. 6, of:

Folder: 'Google'→Folder: 'lightweight bagless vacuum cleaners'→Bookmark name: 'fredbloggs.electrics'

→Folder 'Hi Fi'

>Bookmark name: 'fredbloggs.electrics'

A further aspect of the present invention involves the way bookmarks are retrieved to redisplay as given web pages by means of the Bookmark management retrieval component 433 (FIG. 4). As the BM/X bookmark looks like, and behaves like, a normal prior-art bookmark as far as implementation is concerned, there is no additional processing required to utilize a BM/X for the redisplay of a web page As far as the physical operations of the user are concerned, the B (229) button (or equivalent) is used to bring up the hierarchy of bookmarks whereby the folder hierarchy is navigated to select the relevant bookmark for redisplay of the associated web page).

However, when the web page is redisplayed it is now possible with the BM/X bookmark to retrace the steps which led to the bookmarked page. This is because the access history of locating the web page represented by the bookmark (that is, the current access sequence 440) saved in the BM/X bookmark and is available when the BM/X bookmark is used to redisplay the associated web page. The retrieval of the bookmarked page is standard prior art processing, initiated via the B (229) icon) in the browser GUI 200.

When a conventional bookmark is retrieved, the associated web page is added onto the end of the current access history sequence (440). In essence, as far as the current access history sequence is concerned, the use of a conventional bookmark to retrieve a web page makes no distinction as to whether the web page was specified via a bookmark or via specification of a direct URL in box 203. The URL of the page is just added onto the end of the current access sequence (440).

So, in the prior art, when a bookmarked page E is retrieved during a browser session, the current access history sequence for the session <H,I,J,K> would be changed to <H,I,J,K,E> where H is the browser home page and I,J and K are any pages visited en route to page E.

However, with the use of BM/X bookmarks as described, the stored access history sequence 153 of web pages used to get to the position whereat the BM/X bookmark was created is also inserted into the current access history sequence to produce current access sequence 440. This functionality, which may or may not be required by the user—and so is under optional control through browser facilities—allows the steps of a BM/X bookmark access history to be retraced by use of the back button 221 from the web page associated with the BM/X bookmark. In the preferred implementation, this restoration need not include the search engine web page but, if desired, the search engine web page and its immediate result could be included in the current access sequence—again under browser configuration control.

So, when the page E is bookmarked, as in step (viii) of the illustrative example above and the search engine and its results web page, A, are not to be included upon retrieval, the current access history sequence 440 would be changed from <H,I,J,K> to <H,I,J,K,B,D,E>

Alternatively, if the browser configuration is such that the browser results are to be included, the current access history sequence (440), namely: <H,I,J,K,A,B,D,E> would be restored and, if the web page representing the search engine were to be included, the current access history sequence (440), namely: <H,I,J,K,se RAH,A,B,D,E> would be stored.

This is a matter of implementation choice as the search engine used and search parameters entered will also be visible in the hierarchy representation as folder names.

Once the current access history sequence (440) has been updated, the browser < (221) and > (222) buttons can be used with the required differing results. So, for example, the user of the < (221) button when E was being displayed would result in web page D being displayed whereas prior-art would display K. Further use of the button 221 would display B and then A, etc. Use of the > button 222, would return towards the bookmarked page.

The preferred implementation of the present invention has relied upon keyboard input. In the general case, any user input device which is capable of rendering that input into search arguments suitable for a search engine is within the scope of the invention. For example, if a MIDI-Keyboard was used to provide input to a musically-based search engine, the bookmark folder name could appear as either the aural representation or musical notes on a stave. The crucial association of input to folder name is still applicable, however.

It will be understood by those skilled in the art that, although the present invention has been described in relation to the preceding example embodiments, the invention is not limited thereto and that there are many possible variations and modifications which fall within the scope of the invention.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims is not to be construed as meaning "consisting only of".

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of bookmarking internet resources in an internet browser, comprising:
   providing to a user an internet resource discovered by a search conducted via said browser in accordance with user supplied criteria;
   creating, responsive to a bookmarking request from said user, bookmark data comprising identifying data for said internet resource and an associated resource representation of said internet resource; and
   creating a hierarchy, for presentation to said user, of representations of internet resources for which bookmarking has been requested and of associated search criteria, each said bookmarked resource representation being placed subordinate to a corresponding associated search criteria representation in said hierarchy;
   wherein a user can navigate to a bookmarked representation of a resource of interest via said corresponding search criteria representation for selection and subsequent retrieval of said resource of interest.

2. The method of claim 1, wherein said associated search criteria comprise a search argument for a search engine.

3. The method of claim 2, wherein said associated search criteria further comprise a search engine identifier.

4. The method of claim 2, wherein creating said hierarchy comprises creating a representation of said search engine and a representation of said search argument, said representation of said search argument being subordinate to said representation of said search engine in said hierarchy.

5. The method of claim 4, further comprising:
   matching resource identifying data in said current access history with known search engine identifying data in order to identify a search engine used in said search; and
   using a name of said identified search engine as a top level search criteria representation in said hierarchy.

6. The method of claim 5, further comprising:
   parsing said resource identifying data which identifies said search engine to extract said search arguments; and
   using said search arguments as a second level representation in said hierarchy.

7. The method of claim 1, wherein said hierarchical representation employs a folder paradigm, wherein said bookmarked resource representations are only revealed upon selection by the user of an associated search criteria representation.

8. The method of claim 1, further comprising recording in said bookmark data a current access history for said internet resource, said current access history comprising resource identifying data of other resources traversed by said browser during a search made by said user to arrive at said internet resource.

9. The method of claim 8, further comprising:
   selecting a bookmarked resource representation in said hierarchy;
   receiving retrace requests from said user; and
   examining said access history for said bookmarked resource representation; and
   retrieving said other resources traversed by said browser in reverse order.

10. The method of claim 1, wherein said resource identifying data comprises a uniform resource locator (URL).

11. The method of claim 10, wherein said resource identifying data comprises a resource name.

12. The method of claim 1, wherein said bookmark data further comprises said associated search criteria.

13. A computer program product for bookmarking an internet resource in an internet browser, the computer program product comprising:
   a non-transitory computer usable storage medium having computer usable program code embodied therewith, the computer usable program code comprising:
   computer usable program code configured to, in response to a bookmarking request from a user corresponding to an internet resource discovered by means of a search conducted in accordance with user supplied search criteria, create bookmark data comprising identifying data for said internet resource and create an associated resource representation thereof; and
   computer usable program code configured to create a hierarchy, for presentation to said user, of representations of internet resources for which bookmarking has been requested and of associated search criteria, each said bookmarked resource representation being placed subordinate to a corresponding associated search criteria representation in said hierarchy;
   wherein a user can navigate to a bookmarked representation of a resource of interest via said corresponding search criteria representation for selection and subsequent retrieval of the respective internet resource.

14. An internet browser system comprising:
   a computing device in communication with the Internet, wherein said computing device is configured to:
   provide to a user an internet resource discovered by an internet search in accordance with user supplied criteria;
   create, responsive to a bookmarking request from said user, bookmark data comprising identifying data for said internet resource and an associated resource representation of said internet resource; and
   create a hierarchy, for presentation to said user, of representations of internet resources for which bookmarking has been requested and of associated search criteria, each said bookmarked resource representation being placed subordinate to a corresponding associated search criteria representation in said hierarchy;
   wherein a user can navigate to a bookmarked representation of a resource of interest via said corresponding search criteria representation for selection and subsequent retrieval of said resource of interest.

15. The internet browser system of claim 14, wherein said associated search criteria of said bookmark data comprise a search argument for a search engine.

16. The internet browser system of claim 15, wherein said associated search criteria include a search engine identifier.

17. The internet browser system of claim 16, wherein said computing device is further configured to create a representation of said search engine and a representation of said search argument which is subordinate to said representation of said search engine in said hierarchy.

18. The internet browser system of claim 14, wherein said hierarchical representation employs a folder paradigm, whereby said bookmarked resource representations are only revealed upon selection by the user of an associated search criteria representation.

19. The internet browser system of claim 14, wherein said computing device is further configured to record in said bookmark data a current access history for the resource of interest, said current access history comprising resource identifying data of resources traversed by said browser system during said search to arrive at said resource of interest.

20. The internet browser system of claim 19, wherein said search engine is itself an internet resource and said computing device is further configured to:
match resource identifying data in said current access history with known search engine identifying data in order to identify the search engine used in said search; and
use a name of said identified search engine as a top level search criteria representation in said hierarchy.

21. The internet browser system of claim 20, wherein said computing device is further configured to:
parse said resource identifying data which identifies the search engine to extract said search arguments; and
use said search arguments as a second level representation in said hierarchy.

22. The internet browser system of claim 19, wherein said computing device is further configured to:
receive a selection of a bookmarked resource representation in said hierarchy;
receive retrace requests from said user;
examine said access history for said bookmarked resource of interest; and
retrieve said other resources traversed by said browser in reverse order.

23. The internet browser system of claim 14; wherein said resource identifying data comprises a uniform resource locator (URL).

24. The internet browser system of claim 14, wherein said resource identifying data comprises a resource name.

25. The internet browser system of claim 14, wherein said bookmark data further comprises said associated search criteria.

* * * * *